(12) United States Patent
Shenk

(10) Patent No.: US 8,381,754 B2
(45) Date of Patent: Feb. 26, 2013

(54) LOW FRICTION BUTTERFLY RING

(75) Inventor: David R. Shenk, South Beloit, IL (US)

(73) Assignee: GE Aviation Systems LLC, Cincinnati, OH (US)

( * ) Notice: Subject to any disclaimer, the term of this patent is extended or adjusted under 35 U.S.C. 154(b) by 0 days.

(21) Appl. No.: 13/162,599

(22) Filed: Jun. 17, 2011

(65) Prior Publication Data

US 2011/0308086 A1    Dec. 22, 2011

Related U.S. Application Data

(62) Division of application No. 11/276,265, filed on Feb. 21, 2006, now Pat. No. 7,984,892.

(51) Int. Cl.
*F16K 1/22* (2006.01)

(52) U.S. Cl. ..................................... 137/15.25; 251/306

(58) Field of Classification Search .......... 251/305–308; 137/15.25, 315.22
See application file for complete search history.

(56) References Cited

U.S. PATENT DOCUMENTS

| | | | | |
|---|---|---|---|---|
| 2,058,996 A | * | 10/1936 | Kollberg | 251/306 |
| 3,409,269 A | * | 11/1968 | Fawkes | 251/175 |
| 4,003,394 A | * | 1/1977 | Adams | 137/15.06 |
| 4,632,360 A | * | 12/1986 | DeSalve | 251/175 |
| 4,860,994 A | * | 8/1989 | Oshima | 251/113 |

* cited by examiner

*Primary Examiner* — John K Fristoe, Jr.
*Assistant Examiner* — David Colon Morales
(74) *Attorney, Agent, or Firm* — GE Aviation Systems LLC; William Scott Andes; John F. Colligan

(57) ABSTRACT

A butterfly valve for controlling the flow of fluid within a bore, including a butterfly and at least one ring extending at least one of substantially and completely around a perimeter of the butterfly and adapted to develop an expansion force in the radial direction when the at least one ring is in a contracted state with respect to the radial direction, wherein the at least one ring is secured to the butterfly in the contracted state and radial expansion due to the developed expansion force of the at least one ring is effectively restrained, wherein the butterfly valve is adapted to operate, when placed in a bore, without friction or substantially without friction between the at least one ring and the bore when the butterfly valve is placed in a closed position within the bore.

8 Claims, 9 Drawing Sheets

LOW FRICTION BUTTERFLY RING

This application is a divisional application of U.S. Ser. No. 11/276,265 filed on Feb. 21, 2006, the entire disclosure of which is incorporated herein by reference.

BACKGROUND

Butterfly valves are one of many types of valves that are used to control the flow of fluids. A conventional butterfly valve includes a disc (also called a butterfly), that is rotated within a housing bore or passage to block fluid flow in varying amounts. Typically, the disc is mounted to turn on an axis that traverses the housing bore or passage so that the disc can rotate between an open position and a closed position. When the disc is in the open position, the plane of the disc is generally coincident or parallel to the direction of flow and the fluid flow rate is maximized. When the disc is in the closed position, the plane of the disc is transverse/orthogonal to the direction of flow and the fluid flow rate is minimized or completely stopped.

Conventional butterfly valves further include a fluid seal that is provided, for example, by the outer edge of the disc or by a sealing member, such as, for example, one or more butterfly rings, that is/are attached to the outer edge of the disc. The fluid seal can engage with the interior of a valve housing or with a seating surface on the interior of a housing or passage to provide fluid sealing when the butterfly is rotated to the closed position.

Butterfly rings are typically contained in a groove around the outer periphery of the butterfly disc. The rings are typically flat and have a circular shape. The rings can include a split to accommodate compression and/or expansion in diameter of the ring.

Rings are typically employed to accommodate surface irregularities and manufacturing tolerances of the butterfly, minimizing inherent leakage that can occur between the butterfly and the housing or passage in which the butterfly is placed. It is often desirable for the rings to be as close to centered in the housing or passage in which the butterfly is positioned as possible. However, using high precision machining and manufacturing to place the rings in the exact center of a bore is not practical. Therefore, conventional rings are typically permitted to float on the butterfly so that the rings can "find" the center of the bore when the butterfly is closed, even though the butterfly may be off center within the bore. In this manner, the rings are centered through contact between the outside edge of the rings and the bore of the housing or passage.

In conventional butterfly valves, the rings expand to the diameter of the housing or passage bore during actuation of the butterfly. In this manner, the rings function as resilient components that accommodate the surface irregularities and manufacturing size tolerances of the butterfly. In conventional butterfly valves, the rings seal the butterfly valve through contact between the outer edges of the rings and the bore of the housing or passage, and seals by contact between the face of the rings and the butterfly (e.g. a groove in the butterfly may be present to accept the rings, allowing the rings to spring outward while still being retained in the groove).

Rings in conventional butterfly valves can function as springs to keep the rings in intimate contact with the bore when the butterfly is in a closed position (the spring effect resulting in the resilient features of the rings). In some designs, these rings can be forced radially outwards by fluid pressure that acts within the butterfly groove between the butterfly disc and the inside edge of the ring or rings. When the fluid pressure is high, the force pressing the rings outward is high. In this way, the rings of conventional butterfly valves can be forced outwards by a combination of mechanical spring force and a fluid pressure force.

SUMMARY OF THE INVENTION

The present inventor has determined that due to expansion of the rings, when the butterfly valve is in an open position, a conventional butterfly valve ring will expand to a diameter that is larger than the bore of a housing or passage. Subsequently, when the butterfly valve is closed, the rings will be forced against the inside bore of the housing or passage, causing contact and friction between the rings and bore during actuation of the valve. This contact and friction will increase as the fluid pressure between the rings and butterfly disc increases. Contact and friction between the rings and bore causes wear on the outside edge of the rings and/or inside the bore almost each time the valve is actuated. Rings of conventional butterfly valves will expand or be forced outwards to accommodate this wear of the outside edge of the rings and/or bore, causing further contact and friction between the rings and bore. Therefore, as the rings and/or bores of conventional butterfly valves wear, the rings will continue to expand or be forced outwards to accommodate this wear so that the rings can continue to engage and press against the bore of the housing or passage, minimizing leakage of the butterfly valve. However, this continued compensation for wear causes the wear of the rings and/or bore to continue, causing the rings and/or bore to eventually wear out and the butterfly valve to lose effectiveness.

If wear resistant materials are used, the cost of the valve will be increased, as such materials are more expensive than conventional materials and it is more difficult to manufacture parts from these materials. The parts of a conventional butterfly valve can also be coated with a material, such as chrome, to minimize friction and provide a wear resistant surface. However, the extra step of plating the parts of the butterfly valve presents an added step in manufacturing, along with added material costs and present hazardous material problems.

Embodiments of the present invention provides a butterfly valve and butterfly valve assembly in which a butterfly valve is adapted to operate without friction or substantially without friction when the butterfly valve is actuated between the closed positions and open positions. The present inventor further provides a method of making a butterfly valve and a method of positioning at least one ring in a butterfly valve so that the butterfly valve is adapted to operate without friction or substantially without friction when the butterfly valve is actuated between closed positions and open positions.

In an exemplary embodiment of the present invention, there is a method of configuring a butterfly valve within a passage or bore such that wear and friction resulting from repeated actuation of the valve is reduced and/or eliminated, at least after the initial relatively limited number of actuations of the valve after installation (relative to the expected total number of actuations during the life of the valve). According to this method, initially, one or more rings are positioned within a ring groove that is formed by (between) a ring retainer that is connected to the butterfly. The ring(s) are initially permitted to float within the ring groove, the ring(s) being in the most expanded position or about the most expanded position at this point in the installation process. That is, the ring retainer is not yet fully attached to the butterfly, thus creating a gap where minimal to no clamping force is applied to the ring(s), permitting the rings to effectively freely expand and contract in the radial direction (i.e., the outer diameter of the rings may get larger and smaller if contraction and expansion forces are applied to the ring, respectively). The butterfly valve is then placed into the passage or bore and moved to the closed position, thus contracting the outer diameter of the ring(s) to the diameter of the bore. Then, the ring retainer is fully attached to the butterfly so that the ring(s) are restrained and effective outward radial expansion of the ring(s) is prevented or substantially prevented. Thereafter, when the butterfly valve is actuated to the open position, the ring(s) are restrained so that effective expansion of the ring(s) is prevented, causing the outward radial expansion of the ring(s) to be prevented or substantially prevented. In this way, the butterfly valve can be adapted to lock the ring(s) in position so that the ring(s) cannot substantially move with respect to the butterfly, nor can the ring(s) substantially expand when the butterfly valve is in the open position. In this manner, by substantially limiting the expansion of the rings caused by a reduction in compressive force applied by the bore diameter when the valve is moved to the open position, wear and friction on the rings may be substantially reduced and/or completely eliminated. Furthermore, by configuring a butterfly valve using this method, the ring(s) can be configured to be positioned in the center of a bore and the butterfly valve can adequately fit within the bore without friction or substantially without friction.

It is noted that in another embodiment of the present invention, instead of installing the butterfly valve in the bore with the rings in the expanded position, the rings may be first contracted to have a diameter smaller than that of the bore and clamped in the groove with the retainer (e.g., the retainer is fully attached to the butterfly) to maintain the smaller diameter. Then, the butterfly valve is placed in the bore in the closed position, whereupon the retainer is loosened from the butterfly (e.g., the retainer is no longer fully attached to the butterfly), permitting the ring(s) to expand to the diameter of the bore. The retainer is then again fully attached to the butterfly to clamp the rings in place, thus effectively locking in the diameter of the ring(s).

It is to be understood that both the foregoing general description and the following detailed description are exemplary and explanatory only, and are not restrictive of the invention as claimed.

BRIEF DESCRIPTION OF THE DRAWINGS

These and other features and advantages of the present invention will become apparent from the following description, appended claims, and the accompanying exemplary embodiments shown in the drawings, which are briefly described below.

FIG. 10b is a detailed view of area D in FIG. 10a.

DETAILED DESCRIPTION

Embodiments of the present invention will be described below with reference to the drawings.

According to an embodiment, a butterfly valve and butterfly valve assembly are provided in which the butterfly valve is adapted to operate without friction or substantially without friction when the butterfly valve is placed in a closed position.

Figure 1:
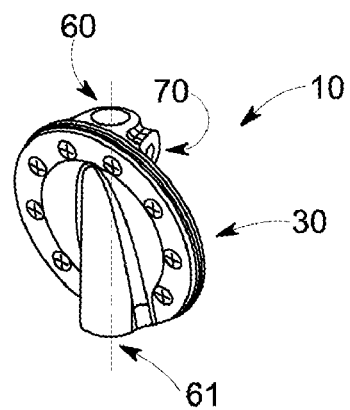
FIG. 1 is a perspective view of a butterfly valve according to an embodiment of the present invention.

FIG. 1 shows a perspective view of a butterfly valve 10, according to an embodiment. In the example shown in FIG. 1, the butterfly valve 10 includes at least one ring 30, and a passage 60 for a shaft (not shown) to support and rotate the butterfly valve 10 in a butterfly valve assembly (i.e. the butterfly valve 10 rotates about axis 61). In the example shown in FIG. 1, the butterfly valve 10 includes a receptacle 70 for a device to position the butterfly valve 10 on the shaft. The butterfly valve 10 can be positioned on the shaft with, for example, a set screw, pin, or other fastening device known in the art. The rings 30 used with the butterfly valve can be made of metal or plastic.

Figure 2:
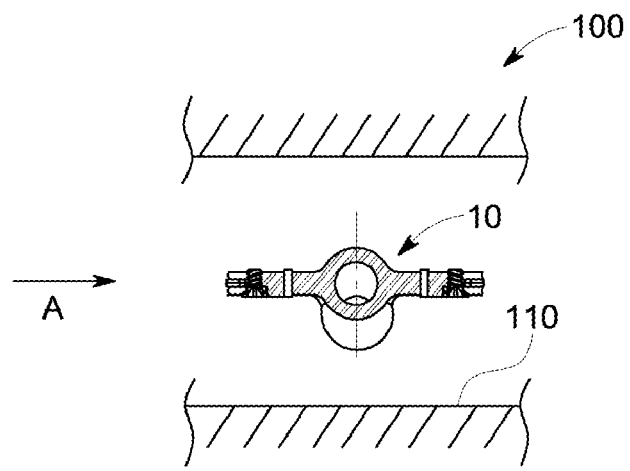
FIG. 2 is a sectional view of a butterfly valve assembly in which the butterfly valve is in the open position.
Figure 3:
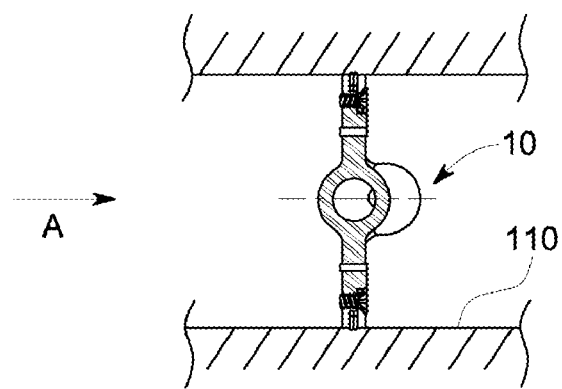
FIG. 3 is a sectional view of a butterfly valve assembly in which the butterfly valve is in the closed position.

In reference to FIG. 2, a butterfly valve assembly according to an embodiment of the present invention can include a housing or valve body with a bore, a butterfly valve as described by any of the embodiments noted above, a shaft for rotating the butterfly valve, bearings for supporting the shaft, and shaft seals. In this regard, FIG. 2 depicts a sectional view of a butterfly valve assembly 100 that includes a butterfly valve 10 that is positioned within a bore 110 of the butterfly valve assembly 100. In the example shown in FIG. 2, the butterfly valve 10 is in the open position, maximizing the flow of fluid through the bore 110. The flow of fluid within the bore 110 is exemplary indicated by arrow A. FIG. 3 is a sectional view of a butterfly valve assembly 100 in which the butterfly valve 10 is in the closed position, minimizing the flow of fluid through the bore 110.

Figure 4:
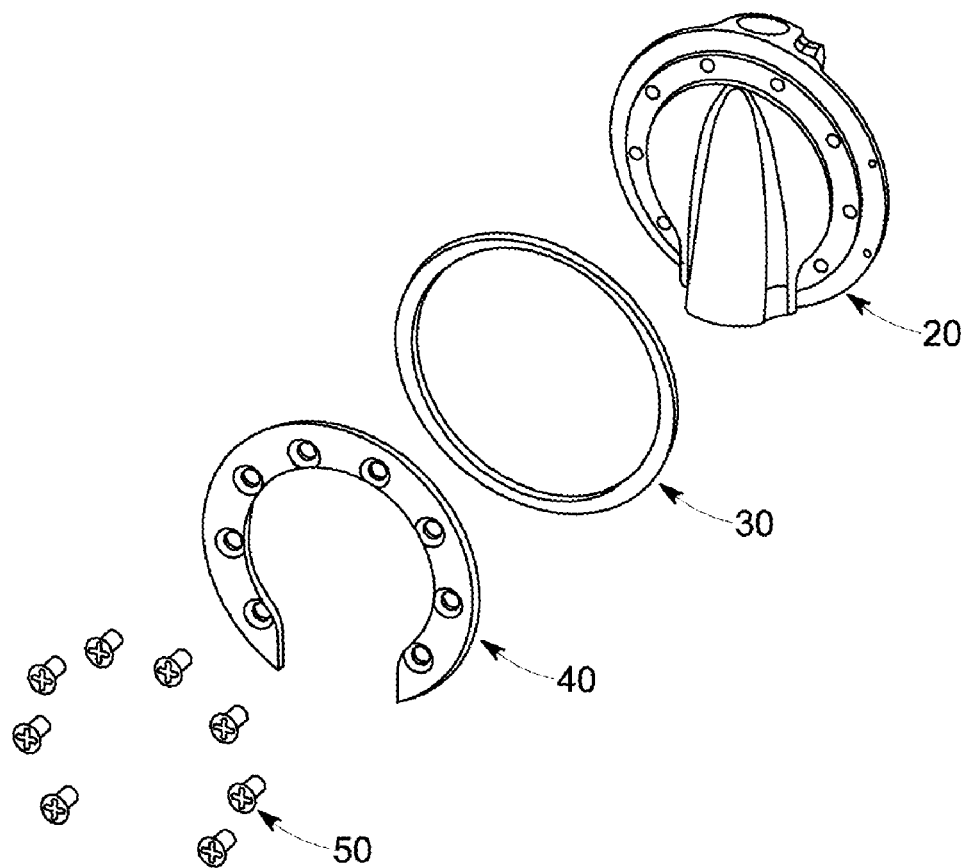
FIG. 4 is an exploded view of a butterfly valve.

FIG. 4 is an exploded view of a butterfly valve 10, according to the embodiment of FIG. 1. The butterfly valve 10 depicted here includes a butterfly 20, one or more rings 30, and a ring retainer 40. As will be described in further detail, the ring retainer 40 can be used to attach at one or more rings 30 to the butterfly 20.

In a further embodiment, the ring retainer 40 can be attached to the butterfly 20 by fasteners 50. The fasteners 50 can be screws, bolts, ties, rivets, or other suitable fastening devices known in the art. In the example shown in FIG. 4, the fasteners 50 are screws. The ring retainer 40 can also be joined to the butterfly 20 through welding, brazing, or other suitable joining methods known in the art.

The ring retainer 40 can be adapted to restrain one or more rings 30. According to an embodiment, the ring retainer 40 functions to restrain the ring(s) 30 so that the radial outward expansion of the ring(s) 30 is effectively prevented. For example, the ring retainer 40 can be adapted to restrain or clamp the ring(s) 30 between the ring retainer 40 and the butterfly 20 to effectively prevent radial expansion or the ring(s) 30 due to the constraint created by the clamping action of the ring retainer 40 and the butterfly 20.

By effectively preventing/restraining radial expansion, it is meant that radial expansion of the rings is at least one of completely prevented and substantially prevented after clamp-up by the retainer and butterfly. Considered one way, the clamping force provided by the ring retainer is sufficient to prevent or substantially prevent any remaining radial spring force in the rings (e.g., spring force that still may be present after the clamping force is provided by the ring retainer) from expanding the outer diameter of the rings beyond the outer diameter obtained after clamping. (As was detailed in the Summary of the Invention section above and is also detailed below, the bore/passage may be used to "set" the outer diameter for clamping when the valve is actuated to the open position, spring forces on the ring(s) will impart an expansion force onto the ring(s), a force that would otherwise expand the outer diameter of the ring(s) beyond the set diameter.)

By way of an exemplary scenario, if the rings have a fully expanded diameter of 2.5 inches (i.e., no remaining spring force in the rings), and the rings are contracted to have a diameter of 2.2 inches and then clamped, the rings will have a spring force that exerts an expansion force on the ring(s). In an exemplary embodiment of the invention, the ring retainer provides a clamping force on the ring(s) such that the ring(s) will at least one of not expand past the diameter of 2.2 inches and only expand to a diameter of slightly more than the clamped diameter of 2.2 inches. By expanding slightly more than the clamped diameter, it is meant that the ring only expands an amount such that any wear or friction between the passage/bore that is developed due to the slight expansion is diminished after a relatively limited number of cycles of the valve with respect to the total number of cycles of the expected life of the valve. That is, the initial cycles of the valve will cause initial wear on the ring(s) due to the ring(s) rubbing against the bore/passage. After the initial wear, the ring will obtain an outer diameter that is essentially constant for substantially all of the remaining service life of the valve. Put another way, the initial wear will transform the ring(s) bore/passage "fit" from a slight interference fit during the initial cycling of the valve to a slip fit for substantially the remaining life of the valve.

During the initial wear period, there will be no friction or substantially no friction between the rings and the bore, especially as compared to at least some of the butterfly valves of conventional type described above in the Background of the Invention section.

Figure 11:
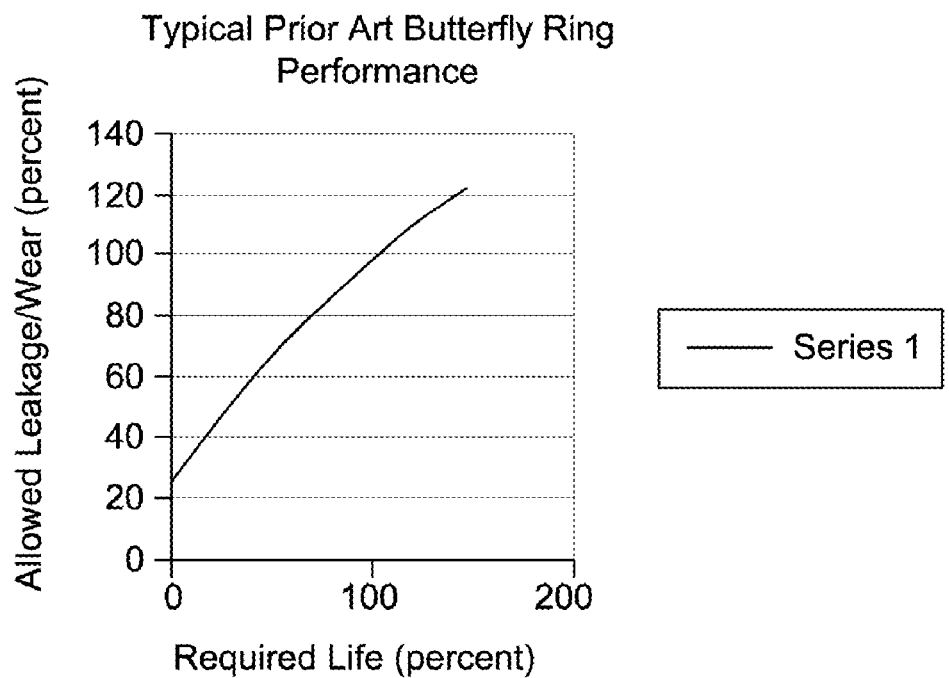
FIG. 11 shows an expected wear pattern of the valve of the present invention.
Figure 12:
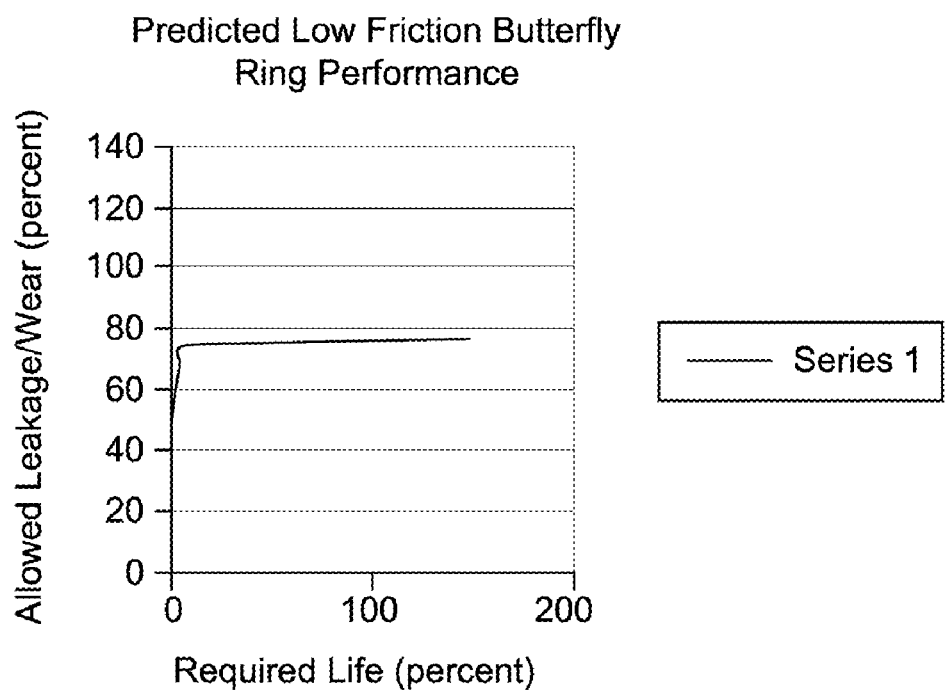
FIG. 12 presents the wear pattern of a prior art valve.

In an exemplary embodiment of the invention, there is a valve that has a life expectancy of at least 1,000 and/or at least 20,000 opening-closing cycles and/or even more, where the first 10-50 or so cycles would wear down the slight expansion of the ring(s) that occurs after the butterfly valve is actuated from the closed position to the open position so that, for the remaining 950-990 cycles (and/or 19,950-19,990 cycles), the rings would slip fit in the bore/passage. That is, during only the first 0 to 1-5% of expected cycles, there would be wear. In other embodiments, there are valves where, during only the first 0 to 0.1-1% of cycles, there would be wear, while in other embodiments, there are valves where, during only the first 0 to 0.5-10% of cycles, there would be wear. In other embodiments, during only the first 0 to 5-20% there would be wear. In another exemplary embodiment, the butterfly valve is adapted to operate, when placed in a bore, in at least one of the following manners over at least the first 1,000 cycles: (i) the at least one ring experiences wear due to substantially no friction between the at least one ring and the bore only during less than the first 150 cycles, and (ii) the at least one ring experiences no wear due to no friction between the at least one ring and the bore during any of the 1,000 (and/or 20,000) cycles. In some embodiments of the present invention, all or substantially all wear occurs at the beginning of the valve life and then subsides to zero, or nearly zero, during the life of the valve. This phenomenon is akin to "break-in." By comparison, prior art valves typically continuously wear, relatively linearly and/or uniformly over the life of the valve. FIG. 11 shows an expected wear pattern of the valve of the present invention, the Y-axis being wear and the X-axis being the life of the valve. For comparison purposes, FIG. 12 presents the wear pattern of a prior art valve, again the Y-axis being wear and the X-axis being the life of the valve. As may be seen by comparing these two figures, the wear in the valve of the present invention occurs at the beginning of the valves lifetime, whereas the wear in the comparison prior art valve occurs continuously, until reaching a point where the valve no longer functions adequately due to wear.

The total amount of wear in an exemplary embodiment of the present invention may be in the range of a few ten thousandths of an inch, zero inches to 0.0001-0.0005 inches. The wear may be on the valve bore or the ring(s) or both. By further comparison, some prior art valves are expected to wear in the range of 0.005 inches over the life of the valve. That is, by way of example, some prior art valves are expected to wear an order of magnitude more than the valve of the present embodiment. In some prior art valves, the life limiting factor for the entire valve in the prior art is ring wear. In contrast, the life limiting factor for some embodiments of the present invention is bearing life or bearing wear.

By arranging the ring retainer 40 to restrain radial expansion of the ring(s) 30, the butterfly valve 10 can be adapted to fit within a bore 110 so that there is no friction or substantially no friction between the ring(s) and the bore 110 during repeated actuation of the butterfly. In this manner, the ring(s) 30 and/or bore 110 do not wear away due to friction between the ring(s) 30 and bore 110 during use of the butterfly valve 10, or at least the wear is substantively minimized and or limited to wear during the initial life of the valve (e.g. the first 0.1-5% of cycles).

According to an embodiment of the invention, the ring retainer 40 can be adapted to restrain the ring(s) 30 so that when the butterfly valve 10 is in the open position, the outward radial expansion of the ring(s) 30 is restrained. In this way, when the butterfly valve 10 is moved to the closed position, the butterfly valve 10, (in particulars the ring(s) 30, properly fit within the bore 110 so that no friction or substantially no friction occurs between the ring(s) 30 and the bore 110 during repeated activation of the butterfly.

Figure 5:
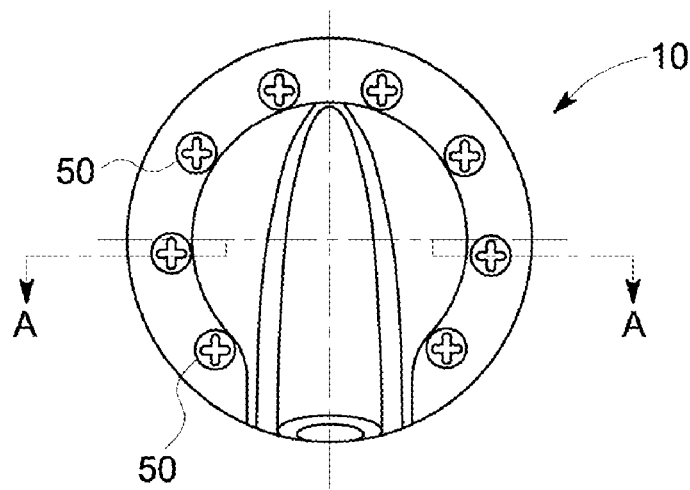
FIG. 5 is a side view of a butterfly valve.
Figure 6:
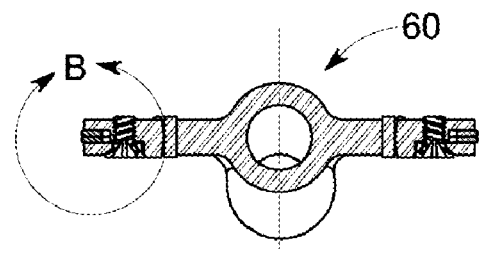
FIG. 6 is a sectional view of the butterfly valve shown in FIG. 5 taken along line A-A.
Figure 7:
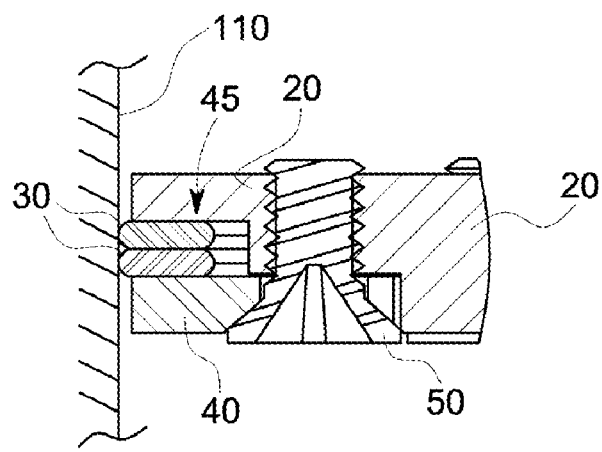
FIG. 7 is a detailed view of region B of the butterfly valve of FIG. 6.

FIG. 5 is a side view of a butterfly valve 10, according to an embodiment. FIG. 6 is a sectional view of the butterfly valve 10 of FIG. 5 taken along line A-A. FIG. 7 is a detailed view of region B of the butterfly valve 10 of FIG. 6. As shown in the example of FIG. 6, the butterfly valve 10 can be adapted so that the ring retainer 40 attaches at least one ring 30 to the butterfly 20. The ring retainer 40 can attach one, two, or more rings 30 to the butterfly 20.

In the example shown in FIG. 7, the ring retainer 40 attaches two rings 30 to the butterfly 20 so that radial expansion of the rings 30 is restrained. In the exemplary embodiment shown in FIG. 7, the tips of the rings 30 is arranged to just contact the bore 110. According to an embodiment, the rings 30 of the butterfly valve 10 can be adapted to contact the bore 110 with minimal force so that no friction or wear, or substantially no friction or wear, occurs between the rings 30 and the bore 110 during activation of the valve. According to another embodiment, the rings 30 can be adapted so that there is a small clearance between the rings 30 and the bore 110, permitting only a small leakage around the butterfly valve 10 while causing no friction or wear between the rings 30 and the bore 110.

According to an embodiment, a butterfly valve 10 can be configured so that the at least one ring(s) 30 is adapted to initially contact the bore 110, causing initial friction with respect to the service life of the valve, between the ring(s) 30 and the bore 110, thus causing the ring(s) to initially wear. However, because the ring(s) 30 is restrained and outward radial expansion of the ring(s) 30 is prevented or substantially prevented, once an initial amount of wear between the ring(s) 30 and the bore 10 occurs, the ring(s) will slip fit within the bore 100 without further friction or substantial friction, and no further wear or substantial wear will occur.

Figure 8A:
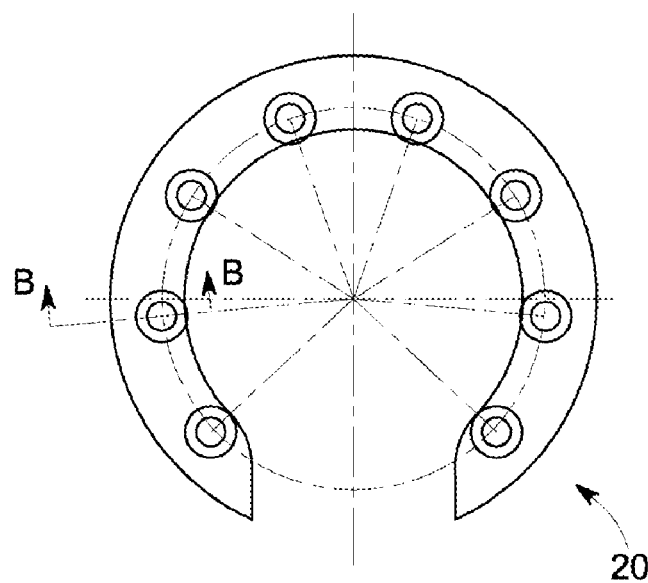
FIG. 8a is a side view of a ring retainer.
Figure 8B:
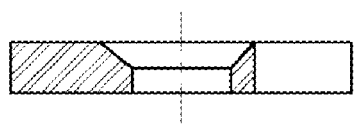
FIG. 8b is a sectional view of the ring retainer of FIG. 8a along line B-B.
Figure 8C:
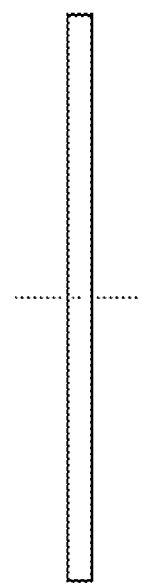
FIG. 8c is an edge view of a ring retainer.
Figure 9A:
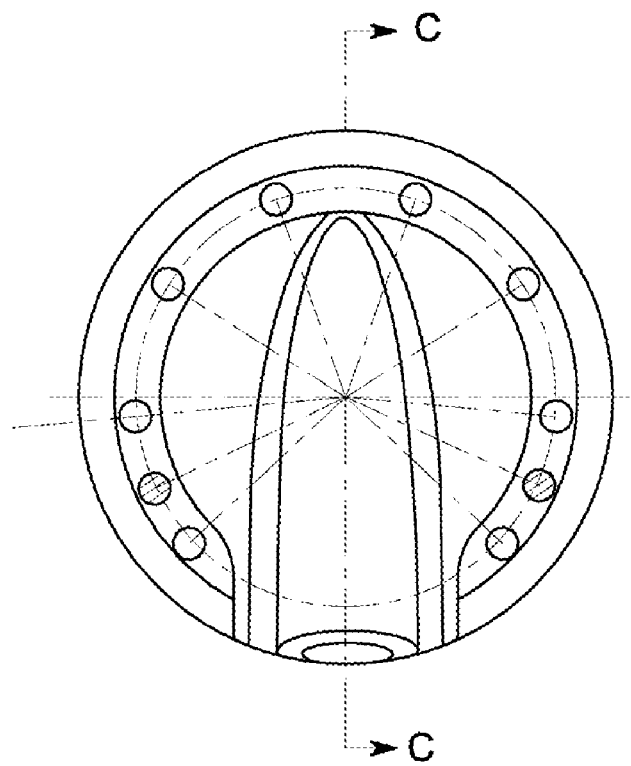
FIG. 9a is a side view of a butterfly valve.
Figure 9B:
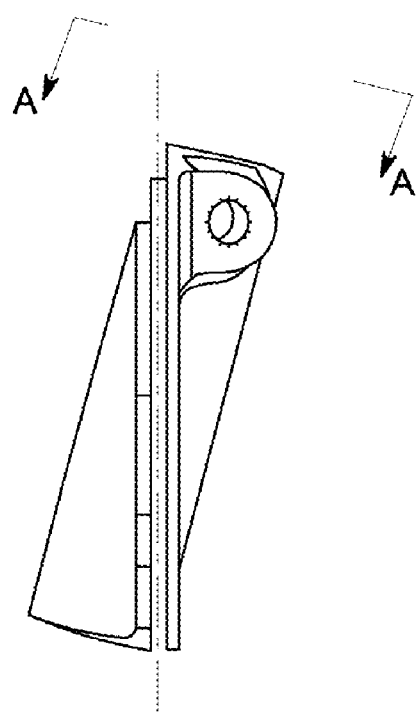
FIG. 9b is an edge view of a butterfly valve.
Figure 9C:
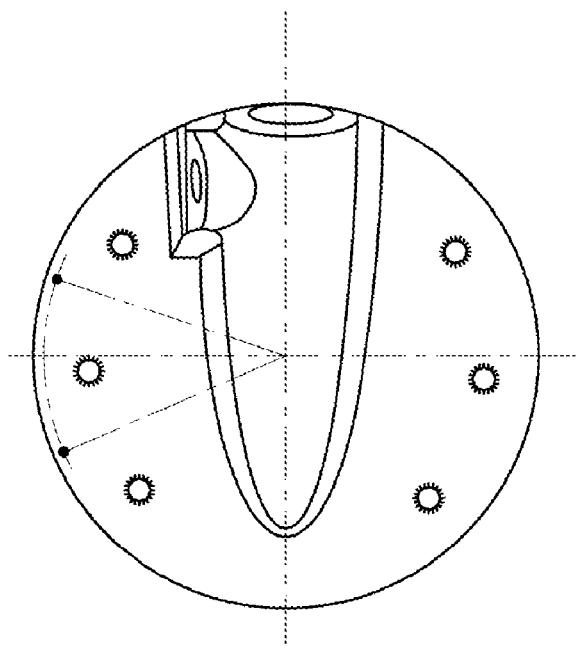
FIG. 9c is a side view of a butterfly valve.
Figure 9D:
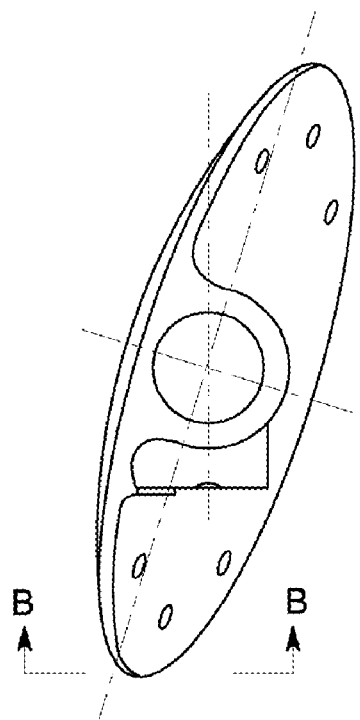
FIG. 9d is an edge view of the butterfly valve of FIG. 9b along line A-A.
Figure 9E:
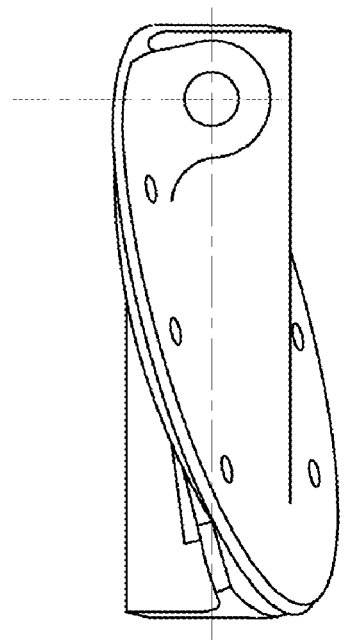
FIG. 9e is an edge view of the butterfly valve of FIG. 9d along line B-B.
Figure 9F:
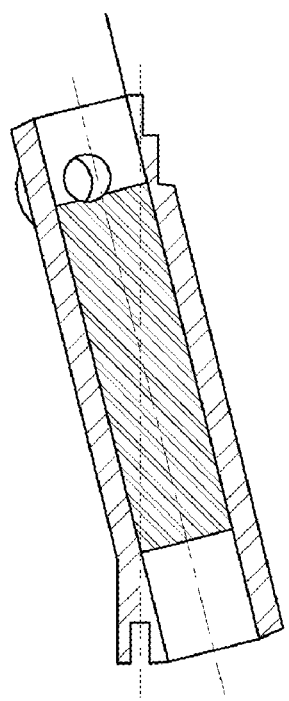
FIG. 9f is a sectional view of the butterfly valve of FIG. 9a along line C-C.
Figure 9G:
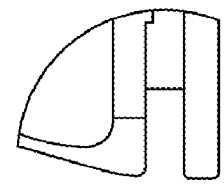
FIG. 9g is a detailed view of area D in FIG. 9b.
Figure 9H:
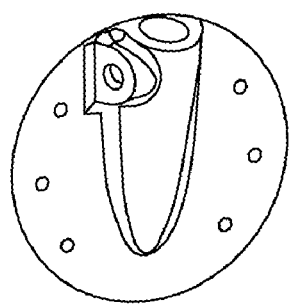
FIG. 9h is a perspective view of a butterfly valve.
Figure 10A:
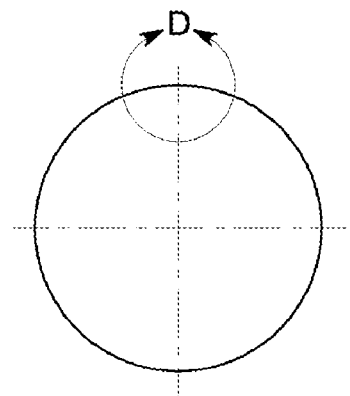
FIG. 10a is a side view of a ring.
Figure 10B:
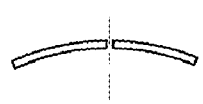
Figure 10C:
FIG. 10c is an edge view of a ring.
Figure 10D:
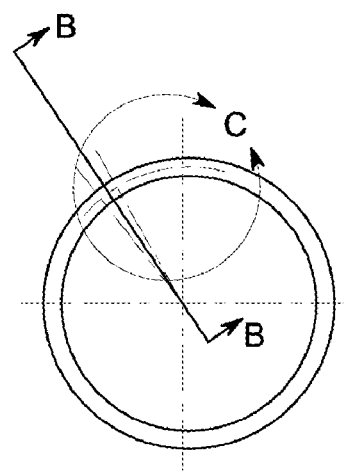
FIG. 10d is a side view of a ring.
Figure 10E:
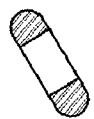
FIG. 10e is a sectional view of the ring of FIG. 10d along line B-B.
Figure 10F:
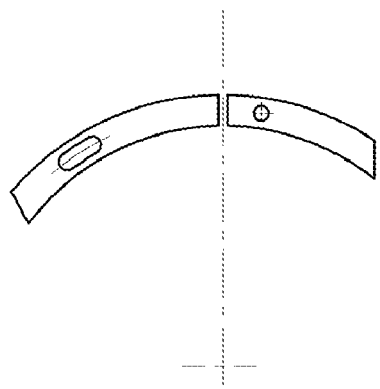
FIG. 10f is a detailed view of area C in FIG. 10d.
Figure 10G:
FIG. 10g is an edge view of a ring.
Figure 10H:
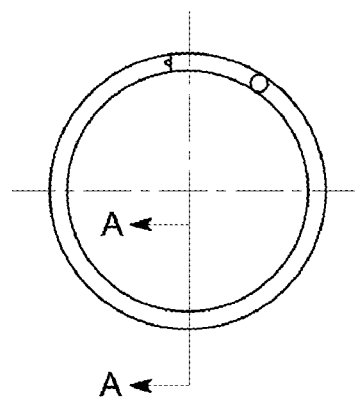
FIG. 10h is a side view of a ring assembly.
Figure 10I:
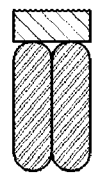
FIG. 10i is a sectional view of the ring assembly of FIG. 10h along line A-A.

FIGS. 8a-8c show views of exemplary embodiments of a ring retainer. FIGS. 9a-9h depicts views of exemplary embodiments of a butterfly valve. FIGS. 10a-10i shows views of exemplary embodiments of a ring and ring assembly.

By using a butterfly valve or a butterfly valve assembly with a butterfly valve according to any of the embodiments mentioned above, a butterfly valve can be provided that produces no friction or substantially no friction with low leakage and no wear or substantially no wear. The butterfly valve of some embodiments can be used with reduced use and/or without the use of costly wear resistant materials or coatings, such as chrome. Furthermore, because the butterfly valve restrains the outward radial expansion of the ring(s), greater bore manufacturing tolerances can be accommodated by the butterfly valve, minimizing the need for costly high precision manufacturing. The butterfly valve described in some or all of the embodiments noted above can be used to accommodate manufacturing positional tolerances, such as the centering of rings within a bore due to inaccurate positioning of valve components. Furthermore, the butterfly valve described in some or all of the embodiments noted above can permit limited leakage around the butterfly valve, but will do so in a consistent manner over time, as opposed to conventional butterfly valves that wear down over time due to friction between rings and the bore.

The butterfly valve described in some or all of the embodiments noted above can be used for newly manufactured butterfly valve assemblies and/or be used to retrofit existing butterfly valve assemblies. The materials for the butterfly valve components, including the bores may be, but do not necessarily need to be, selected to be compatible with one another.

A method according to an embodiment of the invention of configuring a butterfly valve 10 within a passage or bore 110 will now be described. Initially, a passage or bore 110 is present without a butterfly (the passage or bore 110 can be the passage or bore of a butterfly valve assembly 100, for example, the passage or bore can be the bore or passage of the housing of a butterfly valve assembly). A butterfly 20 is positioned within the bore 110 and at least one ring 30 is positioned within a ring groove 45 (see, e.g. FIG. 9) that is formed between the ring retainer 40 and the butterfly 20 so that the ring(s) 30 is initially permitted to float within the ring groove 45. The ring is constricted and then the ring retainer 40 is used to hold the ring in the constricted state. The butterfly valve 10 is then moved to the closed position and the ring(s) 30 is permitted to expand to the diameter of the bore by adjusting the ring retainer 40. Then, the ring retainer 40 is fully attached to the butterfly 20 so that the ring(s) 30 is restrained and further outward radial expansion of the ring(s) is prevented or substantially prevented. Thereafter, when the butterfly valve 10 is moved to the open position, the ring(s) 30 is restrained so that the effective expansion of the ring(s) 30 is prevented, causing outward radial expansion of the ring(s) 30 to be prevented or substantially prevented. In this way, the butterfly valve 10 can be adapted to lock the ring(s) 30 in position so that ring(s) 30 can not move with respect to the butterfly 20, nor can the ring(s) 30 expand when the butterfly valve is in the open position. Furthermore, by configuring a butterfly valve 10 using this method, the ring(s) 30 can be configured to be positioned in the center of a bore 110 and the butterfly valve 10 can properly fit within the bore 110 without friction or substantially without friction. As noted above, another method of installing the butterfly valve into the passage includes utilizing the bore to constrict the ring(s), and then clamping the ring(s) in place. Many of the above embodiments detail how effective expansion of the ring(s) is prevented. In some of these embodiments, prevention of effective expansion does not include prevention of expansion due to temperature changes of the ring(s). That is, in some embodiments of the present invention, temperature changes may expand the ring(s) such that an interference takes place between the two after the initial wear period resulting in a slip fit of the ring(s) within the bore/passage, and in the case of such expansion, embodiments of the present invention would still prevent effective expansion of the ring(s).

In an exemplary embodiment of the invention, after the initial wear on the rings occurs, the butterfly valve placed in a bore with an inner diameter of 2.5 inches may be placed in the closed position and subjected to a pressure of a gas, such as, for example, air, at approximately 25 pounds per square inch, and experience a leakage of only about 0.1 to 0.4 pounds per minute.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention.

What is claimed is:

1. A method of configuring a butterfly valve within a bore, comprising: obtaining a butterfly valve including a butterfly and at least one ring attached to the butterfly; extending the at least one ring completely around a perimeter of the butterfly, wherein the butterfly valve includes a clearance for the at least one ring to expand and contract, wherein the at least one ring is adapted to develop an expansion force in the radial direction when the at least one ring is in a contracted state with respect to the radial direction; contracting the at least one ring to develop the expansion force in the radial direction; securing the at least one ring to the butterfly in the contracted state so that radial expansion due to the developed expansion force of the at least one ring is effectively restrained; placing the butterfly valve within the bore having an inner diameter so that the butterfly valve is in a closed position; unsecuring the at least one ring from the butterfly and permitting the at least one ring to expand to the inner diameter of the bore; and resecuring the at least one ring to the butterfly so that further outward radial expansion of the at least one ring is effectively restrained.

2. A method of configuring a butterfly valve within a bore according to claim 1, wherein the butterfly valve is adapted to operate without friction or substantially without friction when the butterfly valve is placed in a closed position from an open position within the bore.

3. A method of configuring a butterfly valve within a bore according to claim 1, further comprising repeatedly actuating the butterfly valve from the closed position to the open position and back to the closed position to wear a portion of the at least one ring away to account for at least a portion of residual expansion that occurs after the ring is resecured to the butterfly so that further outward radial expansion of the at last one ring is effectively restrained.

4. A method of retrofitting a butterfly valve assembly, comprising: removing an older butterfly valve from the bore; and installing a butterfly valve according to claim 1.

5. A method of configuring a butterfly valve within a bore, comprising: obtaining a butterfly valve including a butterfly and at least one ring attached to the butterfly; extending the at least one ring completely around a perimeter of the butterfly, wherein the butterfly valve includes a clearance for the at least one ring to expand and contract, wherein the at least one ring is adapted to develop an expansion force in the radial direction when the at least one ring is in a contracted state with respect to the radial direction; placing the butterfly valve in a closed position within the bore wherein the bore has an inner diameter that creates an interference fit with the at least one ring contracting the ring; and securing the at least one ring to the butterfly so that outward radial expansion of the at least one ring is effectively restrained.

6. A method of configuring a butterfly valve within a bore according to claim 5, wherein the butterfly valve is adapted to operate without friction or substantially without friction when the butterfly valve is placed in a closed position from an open position within the bore.

7. A method of configuring a butterfly valve within a bore according to claim 5, further comprising repeatedly actuating the butterfly valve from the closed position to the open position and back to the closed position to wear a portion of the at least one ring away to account for at least a portion of residual expansion that occurs after the ring is resecured to the butterfly so that further outward radial expansion of the at least one ring is effectively restrained.

8. A method of retrofitting a butterfly valve assembly, comprising: removing an older butterfly valve from the bore; and installing a butterfly valve according to claim 5.

* * * * *